United States Patent [19]

Suzuki et al.

[11] Patent Number: 4,874,881
[45] Date of Patent: Oct. 17, 1989

[54] METHOD FOR PRODUCING A POLYDIORGANOSILOXANE HAVING A PENDENT ALKENYL RADICAL AT ITS MOLECULAR CENTER

[75] Inventors: Toshio Suzuki; Tadashi Okawa, both of Chiba, Japan

[73] Assignee: Toray Silicone Company, Ltd., Tokyo, Japan

[21] Appl. No.: 242,016

[22] Filed: Sep. 8, 1988

[30] Foreign Application Priority Data

Sep. 8, 1987 [JP] Japan .................. 62-224939

[51] Int. Cl.$^4$ .............................................. C07F 7/08
[52] U.S. Cl. .................................................. 556/453
[58] Field of Search .......................................... 556/453

[56] References Cited

U.S. PATENT DOCUMENTS

| | | | |
|---|---|---|---|
| 3,002,951 | 10/1961 | Johannson ...................... | 260/46.5 |
| 3,146,251 | 8/1964 | Brown et al. ................... | 556/453 X |
| 3,294,740 | 12/1966 | McVannel ....................... | 260/46.5 |
| 4,075,169 | 2/1978 | Razzano ......................... | 260/448.2 |
| 4,287,353 | 9/1981 | Bluestein ........................ | 556/459 |
| 4,611,042 | 9/1986 | Rivers-Farrell et al. ....... | 556/453 X |
| 4,792,596 | 12/1988 | Ottlinger et al. ............... | 556/453 X |

FOREIGN PATENT DOCUMENTS

| | | | |
|---|---|---|---|
| 3436164 | 4/1966 | Fed. Rep. of Germany ...... | 556/453 |
| 59-78236 | 5/1984 | Japan ............................... | 556/453 |

OTHER PUBLICATIONS

Macromolecules, vol. 3, No. 1, (1970), Author: J. Saam, pp. 1-4.

Primary Examiner—Paul F. Shaver
Attorney, Agent, or Firm—Roger H. Borrousch

[57] ABSTRACT

Polydiorganosiloxanes which have a pendent alkenyl radical in the middle of the molecular chain are prepared by a nonequilibrium, living polymerization of cyclic trisiloxanes using an organopolysiloxane alkali metal salt of the formula

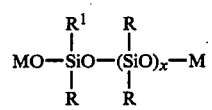

where M is lithium, sodium, or potassium, which takes place under substantially anhydrous conditions, and the polymerization is terminated with an end-capping reaction to produce a polydiorganosiloxane of the formula

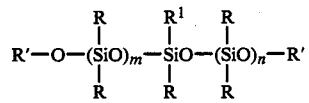

where $R^1$ is an alkenyl radical. These polymers can be used to make graft copolymers and can be made more functional when the ends are capped with functional groups.

11 Claims, No Drawings

METHOD FOR PRODUCING A POLYDIORGANOSILOXANE HAVING A PENDENT ALKENYL RADICAL AT ITS MOLECULAR CENTER

BACKGROUND OF THE INVENTION

1. Field of the Invention

The present invention relates to a method for the preparation of polydiorganosiloxane having a pendant alkenyl radical in the middle of the molecular chain. More specifically, the present invention relates to a method for the preparation, by nonequilibrium polymerization, of polydiorganosiloxane having an alkenyl radical at least as a pendent radical in the middle of the molecular chain and having freely selected groups at both molecular terminals.

2. Prior Art

Equilibrium polymerization involving the ring-opening polymerization of cyclic trisiloxane under alkali metal catalysis is a procedure known and practiced in the art, such as described by Johannson in U.S. Pat. No. 3,002,951, issued Oct. 3, 1961. Johannson teaches alkali metal polyorganosiloxane salts, such as the compound of the formula

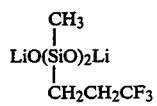

can be used to polymerize polydiorganosiloxane cyclic trimers by heating the mixture at temperatures in the range of from 30° C. to 250° C. for 5 minutes to 3 days to produce linear polydiorganosiloxanes. Johannson teaches that with his method that the cyclotrisiloxanes will form high polymers at a rate appreciably greater than the degradation of these high polymers to cyclic siloxanes where these are primarily cyclotetrasiloxanes.

Another method for preparing polymers under nonequilibrium conditions is described in McVannel in U.S. Pat. No. 3,294,740, issued Dec. 27, 1966. McVannel teaches that cyclotrisiloxanes can be polymerized without the need to deactivate the catalyst to stabilize the produced linear polymers. McVannel achieves this by using as the polymerization catalyst alkali metal phenoxides or other phenyl compounds having from one to three MO- groups bonded to the aromatic ring of the formula

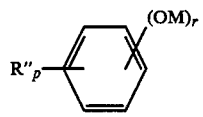

where R" is a monovalent hydrocarbon radical, a monovalent halogenated hydrocarbon radical, halogen atom, or monovalent hydrocarbonoxy radical, and p is 0 to 3, r is 1 to 3, and M is an alkali metal atom. McVannel teaches that the polymerization temperature can be any temperature including room temperature, but preferably from 50° C. to 200° C. McVannel teaches that traces of water may cause depolymerization and that certain metal oxides can be used to remove the water, such as calcium oxide. McVannel also teaches carrying out the polymerization in an organic solvent.

Razzano in U.S. Pat. No. 4,075,169, issued Feb. 21, 1978, teaches that perfluoroalkylethylene substituted cyclic trisiloxanes can be polymerized to make block copolymers using certain dilithium compounds, such as those of the formulae:

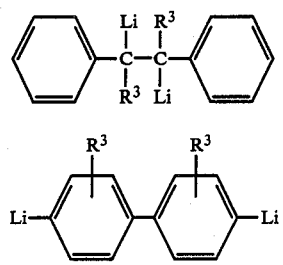

where $R^3$ is hydrogen or a lower alkyl radical of one to eight carbon atoms. Razzano teaches using a solvent promoter at reflux temperatures of 55° C. to 85° C. The block copolymers prepared by Razzano's method are particularly described as containing trifluoropropylmethylsiloxane units and diphenylsiloxane units, but alkylvinylsiloxane units are also suggested.

Bluestein in U.S. Pat. No. 4,287,353 issued Sept. 1, 1981 teaches a method for producing silanol chain-stopped fluorosilicone fluid by reacting at 25° C. to 100° C. cyclic fluorosiloxane trimer, water, a polymerization catalyst such as KOH, and a polyethyleneglycol dimethyl ether promoter. In a more specific method Bluestein teaches using a mixture of fluoro-substituted cyclotrisiloxane and one or more of dimethylsilicone cyclic trimer, methylvinylsilicone cyclic trimer, methylphenylsilicone cyclic trimer, and diphenylsilicone cyclic trimer.

Furthermore, it is also known that nonequilibrium polymerization can be carried out by so-called "living polymerization" using a lithium catalyst. For example, as disclosed in J. Saam, et al., in Macromolecules, Volume 3, Number 1, page 1 (1970), after the ring-opening of hexamethylcyclotrisiloxane using butyllithium, polymerization is terminated by the addition of vinylchlorosilane to afford polydiorganosiloxane having a vinyl group at one terminal. The same method for the preparation of organopolysiloxane is also disclosed in Japanese Patent Application Laid Open [Kokai] Number 59-78236 [78236/84], published May 7, 1984, assigned to Toa Gosei Chem. Ind. Ltd. This method of introducing functional groups through a functionalized polymerization termination agent is generally known as the "termination method."

3. Problems in the Prior Art

However, this prior art suffers from the following problem: in the termination method in living polymerization, the chain-capping reaction at the terminals is conducted when high molecular weights have been reached, and alkenyl thus can be introduced only at the molecular chain terminals. Furthermore, when the introduction of pendant alkenyl into the molecule is attempted by equilibrium polymerization, not only is it not possible to control the position of the alkenyl group, but polydiorganosiloxane completely lacking alkenyl in the molecule is produced as a by-product.

SUMMARY OF THE INVENTION

The present inventors carried out extensive research in order to improve upon the drawbacks to the prior methods as described above, and achieved the present invention as a result. That is, the present invention has as its object the introduction of a method for the preparation, by living polymerization, of polydiorganosiloxane in which an alkenyl radical has been introduced at least as a pendant group in the middle of the molecular chain.

Said goal of the present invention is achieved by means of a method for the preparation of a polydiorganosiloxane with the following formula having a pendant alkenyl radical in the middle of the molecular chain

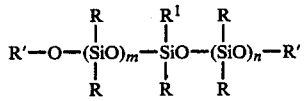

comprising polymerizing cyclic trisiloxane of the formula

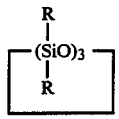

using an organopolysiloxane alkali metal salt of the formula

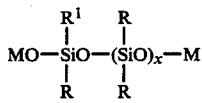

as the polymerization initiator under nonequilibrium conditions, terminating the polymerization when the desired polydiorganopolysiloxane is obtained, in the above formulas, $R^1$ is an alkenyl radical; each R is a monovalent hydrocarbon group or monovalent halogenated hydrocarbon group, and these groups may be the same or different; M is an alkali metal; x is an integer having a value from one to ten; R' is the hydrogen atom or a monovalent end-capping group; m is at least $x+3$; and n is at least $x\pm 3$.

DESCRIPTION OF THE PREFERRED EMBODIMENTS

To explain the preceding in detail, the organopolysiloxane alkali metal salt used as the polymerization initiator characteristically has an alkenyl radical bonded to the silicon atom at one molecular chain terminal, while alkali metal replaces the hydrogen atom on the hydroxyl group bonded to this same silicon atom and bonded to the silicon atom at the other molecular chain terminal. The organopolysiloxanes of the organopolysiloxane alkali metal salts are polydiorganosiloxanes. Method for the preparation of these organopolysiloxane alkali metal salts are in fact known. For example, polydiorganosiloxane simultaneously containing silanol and an alkenyl radical can be prepared by the careful hydrolysis of the corresponding alkenyl-containing dichloropolysiloxane in dilute aqueous base solution, and this product is then reacted with an alkali metal compound. Examples of the alkali metal comprising M are lithium, sodium, and potassium. As is generally the case in the living polymerization of organopolysiloxane, the use of lithium is most preferred. Furthermore, the lithuim salt of the silanol group is tyipcally prepared by reaction with alkyllithium, and the use of n-butyllithium is most suitable in the present invention.

In contrast to the general tendency of the ethylenic double bond to undergo polymerization under alkali catalysis, a distinctive feature of the present invention is that the alkenyl radical remains stable throughout the entire process for the preparation of the target polydiorganosiloxane as a consequence of the use of organopolysiloxane with a special structure as a starting material for the polymerization initiator in the present invention.

Considering ease of starting material purification and ease of handling, the alkenyl radical, $R^1$, preferably has from two to ten carbon atoms and more preferably has from two to six carbon atoms. These alkenyl groups are exemplified by vinyl, allyl, butenyl, hexenyl, and decenyl. No particular restriction obtains on the location of the double bond in the alkenyl group. It will be advantageous for the double bond to appear at the terminal of the alkenyl radical when considering the reactivity of the obtained polymer. R represents the same or different monovalent hydrocarbon group or monovalent halogenated hydrocarbon group. Considering ease of synthesis, it is preferred that methyl comprise all or most of these groups. Other than methyl, these silicon-bonded groups are exemplified by alkyl groups such as ethyl, propyl, butyl, and pentyl; aryl groups such as phenyl, tolyl, and xylyl; aralkyl groups such as benzyl and phenethyl; and halogenated alkyl groups such as chloromethyl, chloropropyl, and 3,3,3-trifluoropropyl. R can be an alkenyl groups when plural alkenyl groups are to be introduced.

In the organopolysiloxane alkali metal salt, x is an integer having a value from one to ten. The lower limit is one; at a value of zero, one finds that the silanol bonded in the precursor organosilane is unstable and dehydration/condensation immediately occurs. An upper limit of ten is given because it is difficult to purify the initial SiCl-containing organopolysiloxane precursor when ten is exceeded. When ease of synthesis is taken into consideration, the use of organopolysiloxane having values of x of three to six will be preferred.

The cyclic trisiloxane used in the present invention comprises those known as monomers for living polymerization. The silicon-bonded substituent is the same or different and is a monovalent hydrocarbon group or monovalent halogenated hydrocarbon group, and these groups are exemplified as above. Again, R can be alkenyl when plural alkenyl groups are to be introduced into the molecular chain. Taking into consideration ease of handling, it is advantageous for the silicon-bonded substituents R in this cyclic trisiloxane to be methyl or phenyl.

The conditions for the polymerization reaction will vary with the type of monomer used. For example, in the case of the polymerization of hexamethylcyclotrisiloxane, the reaction is preferably carried out in a solvent at a temperature of zero to 30 degrees Centigrade for 1 to 50 hours. Any aprotic solvent which can dissolve the starting materials and polymer product is suitable, and examples are aromatic solvents such as benzene, toluene, and xylene; aliphatic solvents such as hexane and heptane; ether solvents such as tetrahydrofuran and diethyl ether; ketone solvents such as acetone and methyl ethyl ketone; ester solvents such as ethyl acetate and butyl acetate; as well as dimethylformamide, dimethyl sulfoxide, and hexamethylphosphoric acid triamide. Furthermore, good results are often obtained for the use of combinations of two or more of these solvents. For example, when a low-polarity solvent like toluene is used, the addition of a high-polarity solvent such as dimethylformamide, dimethyl sulfoxide, hexamethylphosphoric acid triamide, etc., may be recommended in order to accelerate the reaction.

With regard to polymerization conditions such as the reaction temperature and time, these must be very carefully regulated in order to avoid redistribution reactions, that is the conditions must be nonequilibrium. When the polymerization reaction becomes an equilibrium reaction through redistribution instead of living polymerization, it becomes impossible to retain the pendant alkenyl radical in the middle of the molecular chain. In other words, when an equilibrium reaction occurs, by-product polymers are generated which lack the alkenyl radical or in which the alkenyl radical is present at an unspecified position in the molecule.

The consumption of starting monomer in the polymerization reaction is generally monitored by gas chromatography. When the extent of the reaction has reached a particular value, the reaction is terminated preferably by a neutralization treatment. Termination at any particular percentage for the extent of the reaction depends entirely on the type of starting monomer and target polymer. In general, the extent of the reaction will be 70 to 100% and preferably will be 80 to 95%.

Water must be removed from the solvent and starting monomer to the extent possible prior to the reaction. The presence of water will cause a reduction in the molecular weight of the polydiorganosiloxane product and an increase in the proportion of polydiorganosiloxane without the alkenyl radical. The following methods are recommended for drying the solvent and monomer: distillation; heating; dry gas bubbling; adsorption by active alumina, silica gel, and zeolite; dehydration over alkali metal or their compounds.

In the method of the present invention, the molecular weight of the polydiorganosiloxane product is determined by the ratio between the initiator and the cyclic trisiloxane consumption. Furthermore, because the silanol group undergoes an exchange reaction with alkali silanolate at very high velocities, the silanol-containing organopolysiloxane used as the starting material for the alkali silanolate initiator can be added in order to adjust the molecular weight. Finally, with regard to the alkali metal, it is suitably present in a quantity sufficient to cause the ring-opening reaction.

The neutralization agent use for termination of the reaction may be any compound which reacts with alkali silanolate to form a stable alkali metal salt. Examples are wet carbon dioxide; mineral acids such as hydrochloric acid and sulfuric acid; carboxylic acids such as acetic acid, propionic acid, and acrylic acid; and chlorosilanes such as trimethylchlorosilane, dimethylchlorosilane, dimethylphenylchlorosilane, and dimethylvinylchlorosilane, etc. When the reaction is terminated with wet carbon dioxide, mineral acid, or carboxylic acid, the terminal of the terminated polymer will be the silanol group. When the reaction is terminated by chlorosilane, the silyl group formed by the elimination of chlorine from the chlorosilane becomes the end-capping group. Thus, the reaction is preferably terminated by the addition of acid when the objective is the introduction of the silanol group at the molecular chain terminals. The reaction is preferably terminated by the addition of the properly functionalized chlorosilane when the objective is the introduction of silicon-bonded functional groups. Furthermore, various types of functional groups can be introduced through a dehydrochlorination reaction by the addition of various types of chlorsilane to the silanolterminated polydiorganosiloxane obtained by termination with acid. In these cases, the use of a hydrochloric acid binder such as an amine is recommended. Various functional groups can also be introduced by reacting the silanol-terminated polydiorganosiloxane with the silazane, aminosilane, silylamide, or alkoxysilane.

With regard to the obtained polydiorganosiloxane, m and n have values of at least 4, an alkenyl radical is present in the middle of the molecular chain, and the group R' at the two molecular chain terminals is either a hydrogen atom or a silyl group which contains, for example, an alkyl group, aryl group, alkenyl group, alkynyl group, or hydrogen atom.

The polydiorganosiloxane with an alkenyl radical in the middle of the molecular chain obtained according to the present invention can be used to prepare graft copolymers with other polymers through the use of this alkenyl radical or functional groups present at both terminals. For example, a graft copolymer of polydiorganosiloxane partners can be prepared by reaction with a trimethylsiloxy-terminated methylhydrogenpolysiloxane in the presence of a platinum catalyst. Also, using polydiorganosiloxane having at least 3 functional groups prepared according to the present invention, one can readily obtain elastomers or resins by reaction with crosslinking organopolysiloxane or other polymers.

The present invention will be explained in the following with reference to illustrative examples and the scope of the invention is properly delineated in the claims. In these examples, Me=methyl, Vi=vinyl, and Hex=-Vi(CH$_2$)$_4$—. The properties were measured at 25 degrees Centigrade unless specified otherwise. The solvents and reagents were dried prior to the experiments to a negligible water content.

EXAMPLE 1

A hydrolysis mixture of 500 g water, 200 g ice, 100 g dietyyl ether, and 84.5 g sodium bicarbonate were placed in a stirrer-equipped four-neck flask. A mixture of 140 g ClMeViSi(OSiMe$_2$)$_3$Cl and 120 g diethyl ether was added dropwise with vigorous stirring to the hydrolysis mixture. After liquid separation, the other phase was dried over anhydrous sodium sulfate. Removal of the ether by evaporation afforded HOMeViSi(OSiMe$_2$)$_3$OH (OH-1).

5 g OH-1, 40 mL tetrahydrofuran, and 20 mL 1.53 N n-butyllithium solution in hexane were placed in a stirrer-equipped four-neck flask. Mixing produced a solution of the lithium salt of OH-1, LiOMeViSi(OSiMe$_2$)$_3$OLi. This is denoted as OLi-1 (concentration by titration=0.55 N).

5.58 mL (3.07 meq) OLi-1, 75 g hexamethylcyclotrisiloxane, and 75 g tetrahydrofuran were placed in a stirrer-equipped four-neck flask, and a reaction was carried out for 4 hours at 25 degrees Centigrade under a nitrogen atmosphere. After the extent of the reaction has reached 89% according to gas chromatography, the reaction mixture was neutralized with wet carbon dioxide. After filtration, the solvent and unreacted starting materials were removed by distillation in vacuo to produce a polymer (VP-1). Based on the results of gel permeation chromatography (GPC), Fourier-transforms nuclear magnetic resonance (FT-NMR), and quantitative vinyl group analysis by iodometry, VP-1 was identified as a polydiorganosiloxane with the following average formula:

$$HO(Me_2SiO)_{260}MeViSiO(Me_2SiO)_{263}H.$$

The dispersion in the molecular weight distribution ($M_w/M_n$) of the polymer was 1.3 by GPC.

EXAMPLE 2

0.34 mL (0.19 meq) OLi-1 as prepared in Example 1, 0.473 g OH-1 (1.45 mmol), 75 g hexamethylcyclotrisiloxane, 75 g toluene, and 1.5 g dimethyl sulfoxide were placed in a stirrer-equipped four-neck flask, and a reaction was carried out for 2.5 hours at 23 degrees Centigrade under an argon atmosphere. After the extent of the reaction had reached 83% according to gas chromatography, neutralization was carried out using acetic acid. After filtration, the solvent and unreacted starting materials were removed by distillation in vacuo to produce polymer (VP-2). Based on the results of GPC and FT-NMR, VP-2 was identified as a polydiorganosiloxane having the following average formula.

$$HO(Me_2SiO)_{275}MeViSiO(Me_2SiO)_{278}H$$

The dispersion in the molecular weight distribution ($M_w/M_n$) of the polymer was 1.13 by GPC.

EXAMPLE 3

HOMeHexSi(OSiMe$_2$)$_3$OH (OH-2) was synthesized by the procedure described in Example 1 for OH-1. Again as in Example 1, a solution of the lithium salt of OH-2 (OLi-2, concentration by titration=0.54 N) was prepared from OH-2 and n-butyllithium. 20.34 mL (0.184 meq) OLi-2, 3.93 g OH-2 (10.3 mmol), 75 g hexamethylcyclotrisiloxane, 75 g toluene, and 2.5 g dimethyl sulfoxide were placed in a four-neck flask equipped with a stirrer and thermometer, and the mixture was stirred at 20 degrees Centigrade for 8 hours. After the extent of the reaction had reached 81% according to gas chromatography, neutralization was carried out using set carbon dioxide. After filtration, the solvent and unreacted starting materials were removed by distillation in vacuo to produce a polymer (VP-3). Based on the results of GPC, FT-NMR, and iodometry, VP-3 was identified as a polydiorganosiloxane of the following formula:

$$HO(Me_2SiO)_{48}MeHexSiO(Me_2SiO)_{51}H$$

The dispersion in the molecular weight distribution ($M_w/M_n$) of the polymer was 1.21 by GPC.

50 g VP-3 (6.87 mmol), 2.0 g dimethylvinylchlorosilane (16.5 mmol), 3.03 g triethylamine (30 mmol), 50 g toluene, and 40 g tetrahydrofuran were placed in a stirrer-equipped four-neck flask, and a reaction was carried out at room temperature for 24 hours. After filtration, the solvent and unreacted starting materials were removed by distillation in vacuo to produce a polymer (VP-4). Based on the results of analysis by GPC, FT-NMR, and iodometry, VP-4 was identified as a polydiorganosiloxane of the following formula:

$$Vi(Me_2SiO)_{49}MeHexSiO(Me_2SiO)_{51}SiMe_2Vi$$

EFFECTS OF THE INVENTION

The method of the present invention for the preparation of polydiorganosiloxane provides for the preparation of polydiorganosiloxane having a pendant alkenyl radical in the middle of the molecular chain and freely selected groups at both molecular chain terminals. Such polydiorganosiloxanes can be used as a starting material for silicone rubber, as a starting material for novel grafted organopolysiloxane, and as a copolymerization partner with resins and plastics other than organopolysiloxanes. Accordingly, one can assign a high degree of utility to these polydiorganosiloxanes in the field of chemical technology.

That which is claimed is:

1. A method for the preparation of a polydiorganosiloxane having a pendant alkenyl radical in the middle of the molecular chain with the following formula $$R'-O-(\underset{\underset{R}{|}}{\overset{\overset{R}{|}}{Si}}O)_m-\underset{\underset{R}{|}}{\overset{\overset{R^1}{|}}{Si}}O-(\underset{\underset{R}{|}}{\overset{\overset{R}{|}}{Si}}O)_n-R'$$

comprising polymerizing cyclic trisiloxane of the formula $$\left[\underset{\underset{R}{|}}{\overset{\overset{R}{|}}{(SiO)_3}}\right]$$

using an organopolysiloxane alkali metal salt of the formula $$MO-\underset{\underset{R}{|}}{\overset{\overset{R^1}{|}}{Si}}O-(\underset{\underset{R}{|}}{\overset{\overset{R}{|}}{Si}}O)_x-M$$

as the polymerization initiator under nonequilibrium conditions where the ingredients are substantially anhydrous, terminating the polymerization when the target polydiorganopolysiloxane is obtained, in the above formulas, $R^1$ is an alkenyl radical; each R is a monovalent hydrocarbon group or monovalent halogenated hydrocarbon group, and these groups may be the same or different; M is an alkali metal; x is an integer having a value from one to ten; R' is the hydrogen atom or a monovalent endcapping group; m is at least $x+3$; and n is at least $x+3$.

2. The method for preparation of a polydiorganosiloxane in accordance with claim 1 wherein $R^1$ is an alkenyl radical having two through six carbon atoms.

3. The method for preparation of a polydiorganosiloxane in accordance with claim 1 wherein R is the methyl group.

4. The method for preparation of a polydiorganosiloxane in accordance with claim 1 wherein x is equal to three.

5. The method for preparation of a polydiorganosiloxane in accordance with claim 1 wherein the alkali metal is lithium.

6. The method for preparation of a polydiorganosiloxane in accordance with claim 1 wherein the reaction is terminated using inorganic acid, organic acid, or organochlorosilane.

7. The method for preparation of a polydiorganosiloxane in accordance with claim 1 in which the polydiorganosiloxane is terminated by the silanol group using inorganic or organic acid and is additionally capped with organochlorosilane.

8. A method for the preparation of a polydiorganosiloxane having a pendant alkenyl radical in the middle of the molecular chain comprising living polymerization in an aprotic solvent at a temperature of from 0° C. to 30° C. for one to 50 hours of cyclic trisiloxane of the formula

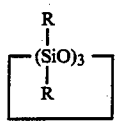

using an organopolysiloxane alkali metal salt of the formula

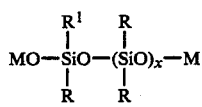

as the polymerization initiator under conditions which avoid redistribution of the siloxane units where the ingredients are dried prior to the use in this method such that they have a negligible water content, terminating the reaction after at least 70 percent of the cyclic trisiloxane is consumed, in the above formulas, $R^1$ is an alkenyl radical; each R is a monovalent hydrocarbon group or monovalent halogenated hydrocarbon group, and these groups may be the same or different; M is an alkali metal; x is an integer having a value from one to ten; R' is the hydrogen atom or a monovalent end-capping group.

9. The method in accordance with claim 8 in which the cyclic trisiloxane is hexamethylcyclotrisiloxane, the organopolysiloxane alkali metal salt has the following formula

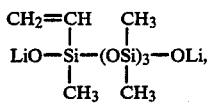

the aprotic solvent is tetrhydrofuran, the consumption of hexamethylcyclotrisiloxane is in the range of 80 to 95 percent, and the reaction is carried out under an inert atmosphere.

10. The method in accordance with claim 9 in which the inert atmosphere is nitrogen and the polymerization reaction is terminated by wet carbon dioxide.

11. The method in accordance with claim 8 in which the cyclic trisiloxane is hexamethylcyclotrisiloxane, the organopolysiloxane alkali metal salt has the following formula

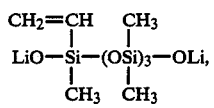

the aprotic solvent is a mixture of toluene and dimethyl sulfoxide, the consumption of hexamethylcyclotrisiloxane is in the range of 80 to 95 percent, and the reaction is carried out under an inert atmosphere, and the method further comprises that there is also present a silanol of the formula:

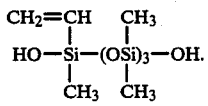

* * * * *